US009722656B2

United States Patent
McDonald et al.

(10) Patent No.: US 9,722,656 B2
(45) Date of Patent: Aug. 1, 2017

(54) MOBILE DEVICE VIDEOGRAPHY SYSTEM

(71) Applicant: Super 6 LLC, Denver, CO (US)

(72) Inventors: Scott McDonald, Denver, CO (US); Alex Bogusky, Boulder, CO (US)

(73) Assignee: Super 6 LLC, Denver, CO (US)

( * ) Notice: Subject to any disclaimer, the term of this patent is extended or adjusted under 35 U.S.C. 154(b) by 0 days.

(21) Appl. No.: 15/189,964

(22) Filed: Jun. 22, 2016

(65) Prior Publication Data

US 2016/0373156 A1     Dec. 22, 2016

Related U.S. Application Data

(60) Provisional application No. 62/182,957, filed on Jun. 22, 2015.

(51) Int. Cl.
| | | |
|---|---|---|
| *H04B 1/3888* | (2015.01) |
| *H04L 12/24* | (2006.01) |
| *H04M 1/725* | (2006.01) |
| *H04W 4/00* | (2009.01) |

(52) U.S. Cl.
CPC ........... *H04B 1/3888* (2013.01); *H04L 41/22* (2013.01); *H04M 1/72527* (2013.01); *H04W 4/001* (2013.01)

(58) Field of Classification Search
CPC combination set(s) only.
See application file for complete search history.

(56) References Cited

U.S. PATENT DOCUMENTS

| | | | |
|---|---|---|---|
| 2010/0182475 A1 | 7/2010 | Witte | |
| 2012/0009896 A1 | 1/2012 | Bandyopadhyay et al. | |
| 2012/0320340 A1* | 12/2012 | Coleman, III | A61B 3/14 351/208 |
| 2013/0222668 A1 | 8/2013 | Anderson | |
| 2013/0229716 A1* | 9/2013 | Thomas | F41G 3/02 359/633 |
| 2013/0328999 A1 | 12/2013 | Roman | |
| 2014/0179372 A1 | 6/2014 | Zajeski et al. | |
| (Continued) | | | |

OTHER PUBLICATIONS

Speaker case with Microphone, ZAGG Apr. 29, 2015.*

(Continued)

*Primary Examiner* — Ankur Jain
*Assistant Examiner* — Zhitong Chen
(74) *Attorney, Agent, or Firm* — Neugeboren O'Dowd PC

(57) ABSTRACT

A system for mobile device photography and videography comprises a camera-shaped case configured to retain a mobile device. A lens of the case may be configured to direct an image into a camera lens of the mobile device, with the lens and the camera lens of the mobile device arranged substantially perpendicularly to each other. The camera-shaped case may also comprise a viewfinder that directs any visible content displayed on a portion of the graphical user interface into an eyepiece attached to the viewfinder. Additionally, the camera-shaped case may comprise an eyepiece connected to the viewfinder, a button disposed configured to actuate a camera function of the mobile device, and a cable to be inserted into the mobile device. The system may also include a downloadable software application executable on the mobile device configured to display an image and one or more videography controls on the graphical user interface.

13 Claims, 12 Drawing Sheets

(56) References Cited

U.S. PATENT DOCUMENTS

2014/0267891 A1    9/2014  Adams
2015/0153544 A1*   6/2015  Pedersen ............ H04N 5/23212
                                                        348/345
2015/0381887 A1*  12/2015  Sato ................... H04N 5/23209
                                                        348/207.11

OTHER PUBLICATIONS

Copenheaver, Blaine R., "International Search Report and Written Opinion re Application No. PCT/US2016/038795", Nov. 3, 2016, p. 12.

* cited by examiner

MOBILE DEVICE VIDEOGRAPHY SYSTEM

PRIORITY

This application claims priority to U.S. Provisional Application No. 62/182,957, filed Jun. 22, 2015, and entitled MOBILE DEVICE VIDEOGRAPHY SYSTEM, which is incorporated herein by reference.

FIELD OF THE DISCLOSURE

The present disclosure relates generally to photography and videography using mobile devices. In particular, but not by way of limitation, the present disclosure relates to systems, methods and apparatuses for improving the usability of cameras that are built into smartphones

BACKGROUND OF THE DISCLOSURE

Modern smartphones are now often equipped with cameras for taking photos and videos, and the capability and quality of these cameras rivals that of some professional digital cameras in terms of resolution, frames per second, contrast ratio, optical image stabilization, and lens quality, among other technical features. However, because smartphones are designed to meet user needs other than those related to the camera, such as texting, calling, playing music, and accessing applications, other smartphone camera features are inconvenient in comparison to dedicated cameras. Namely, physical limitations of smartphone designs often negatively impact the quality of photos and videos taken by users. For example, large flat screens make it difficult to see the content of a shot in direct sunlight, the flat geometry of most smartphones make them difficult to hold, and the touchscreen and side buttons used for other functions are often inconveniently placed for shooting photos. Photographers often judge the quality of a dedicated camera by its "form factor," which is a term that describes the overall feel, convenience, and ease of use of a camera, because form factor can be an important consideration in the quality of a shot. Because the designs of most smartphones lend themselves to poor form factor, the quality of photographed or recorded content on smartphones often suffers even though the technical capabilities of the camera are superb.

Further, more people than ever before are taking pictures and videos because of the ubiquity of cameras in smartphones. Individuals who did not take many photos or videos prior to the advent of smartphones, or who did not care much about the quality of photos and videos they did take, are now more inclined to take them and care about their quality, given that smartphones give them more convenient opportunities to explore photography and videography. Additionally, many modern ways of social interaction, such as social media, place an emphasis on photos and videos, and provide easy-to-use tools to share user experiences. As a result, more and more individuals will seek to make the most of their high-quality phone cameras, and may become dissatisfied with the final output that results from their poor form factor. Similarly, photography enthusiasts and professionals who understand that the technical capabilities of their smartphone cameras are comparable with dedicated cameras may become dissatisfied knowing that poor form factor limits them from using a smartphone for professional quality shots.

SUMMARY

One aspect of the present disclosure provides a camera-shaped case for a mobile device having an integrated camera. The camera-shaped case may comprise a main body comprising a receptacle configured to retain a mobile device. The case may also comprise a lens connected to a front side of the main body, the lens configured to direct light received through the lens into a camera lens of the mobile device, and the lens and the camera lens of the mobile device may be arranged substantially perpendicularly to each other. An eyepiece may be connected to a back side of the main body, the eyepiece being configured to direct an image from a graphical display on the mobile device such that the image is viewable through the eyepiece. The case may further comprise a button disposed on the exterior of the camera-shaped case configured to actuate a camera function of the mobile device.

Another aspect of the present disclosure provides a system for mobile device photography and videography. The system may comprise a camera-shaped case configured to retain a mobile device, and the camera-shaped case itself may comprise a lens affixed to a front side of the camera-shaped case. The lens may be configured to direct an image received through the lens into a camera lens of the mobile device, and the lens and the camera lens of the mobile device may be arranged substantially perpendicularly to each other. The camera-shaped case may also comprise a viewfinder that covers a portion of a graphical user interface on the mobile device, the viewfinder being configured to direct any visible content displayed on the portion of the graphical user interface into an eyepiece attached to the viewfinder. Additionally, the camera-shaped case may comprise an eyepiece connected to the viewfinder such that the visible content is viewable through the eyepiece, a button disposed on the camera-shaped case configured to actuate a camera function of the mobile device, and a cable configured to be inserted into a headphone jack of the mobile device. The system may also include a downloadable software application executable on the mobile device and configured to display an entire version of the image received through the camera lens of the mobile device onto the portion of the graphical user interface. The application may be configured to display one or more videography controls on a touchscreen portion of the graphical user interface.

Another aspect of the present disclosure provides a downloadable software application for photography and videography on a mobile device. The application may be configured to display a first version of an image received through a camera lens of the mobile device onto a portion of a touchscreen user interface of the mobile device, wherein a size of the first version of the image corresponds to a size of a viewfinder apparatus on a case for the mobile device, and initiate a recording in response to a signal received through a cable, the signal being sent through the cable in response to the pressing of a physical button on the case.

DETAILED DESCRIPTION

Aspects of the present disclosure relate to a camera-shaped case for a mobile device and a downloadable software application for photography and videography on the mobile device, and related systems and methods, for improving the usability of smartphone cameras. Although particular types of smartphones may be depicted and described herein, the disclosure may apply to other makes and models of smartphones, as well as to other mobile computing devices that are equipped with cameras, including tablet computers, personal digital assistants, music players, and wearable devices.

Over time, the sizes and shapes of professional cameras—and particularly of professional video cameras, has varied greatly. The variations were often due to a few main factors, including the size of the film or other recording medium, the size of the lens, the size of the electronic or physical components necessary to make the recording possible, the ability to preview the shot being recorded, and the ability to reach the camera's controls. Cameras have evolved in size and shape from stationary hand-cranked reels, to the first personal VHS tape cameras that were large enough to rest on a user's shoulder, to the modern camcorders that fit a user's hand cupped around one side. Some of the most popular designs for high-quality, and even professional video recording cameras over time were those that utilized "Super 8 mm" film. Super 8 mm film and cameras were originally manufactured by the Kodak Company of Rochester, N.Y., and then by many other manufacturers soon after. Super 8 mm cameras themselves varied in size and design, but many were characterized in part by having a substantially vertical grip, a viewfinder with an eye piece, a trigger for starting and stopping recording that is accessible by the hand holding the vertical grip, and an interface for interchangeable lenses. An aspect of the present disclosure provides a camera body that incorporates popular physical features from traditional cameras (including Super 8-style and others) and uses them to improve the experience of taking digital photos and videos with a modern smartphone.

Figure 1:
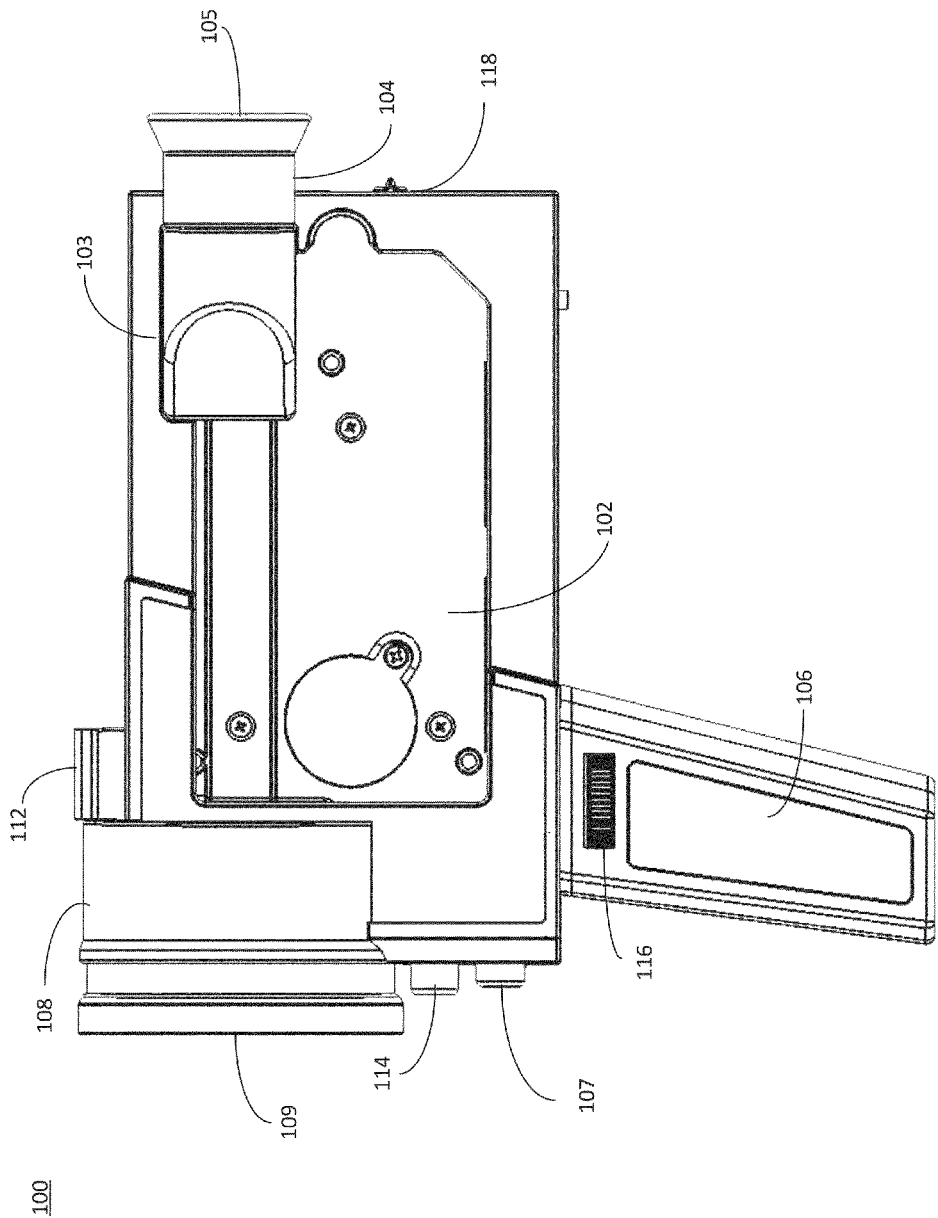
FIG. 1 shows a side view of an embodiment of a camera-shaped case for a mobile device in accordance with the present disclosure.

FIG. 1 shows a side view of an embodiment of a camera-shaped case 100 in accordance with the present disclosure. Throughout the disclosure, the camera-shaped case may alternatively be referred to as a "camera body" "camera case," or simply "case." The camera-shaped case 100 is depicted with a receptacle configured to retain a mobile device such as a smartphone, which may comprise a substantially rigid physical structure that holds the mobile device securely. The camera-shaped case 100 as depicted has an open sidewall that allows a touchscreen of a smartphone to remain visible and accessible to a user while it is inserted into the smartphone receptacle 102. The utility of the touchscreen remaining visible and accessible will be discussed later in this disclosure. The camera body 100 also comprises a viewfinder 103, which is attached to a focus ring 104 and an eyepiece 105. The camera body 100 in the embodiment depicted further comprises a handle 106, a trigger button 107, a lens mount 108, and a lens 109. The embodiment depicted includes an accessory shoe 112 that may allow the attachment of accessories such as straps. The handle 106 also includes a thumbwheel screw 116 which may be unscrewed to remove the handle 106 and expose a tripod mount on the underside of the camera body 100 (not depicted). The camera body 100 also includes a retaining mechanism 118 that allows the mobile device to be retained securely within the smartphone receptacle 102 when rotated into a locked position and allow easy removal of the mobile device when rotated into an unlocked position.

Figure 5B:
FIG. 5B shows a back perspective view of a system of the present disclosure, with a mobile device being retained within a camera-shaped case and executing a downloadable software application for photography and videography.
Figure 5A:
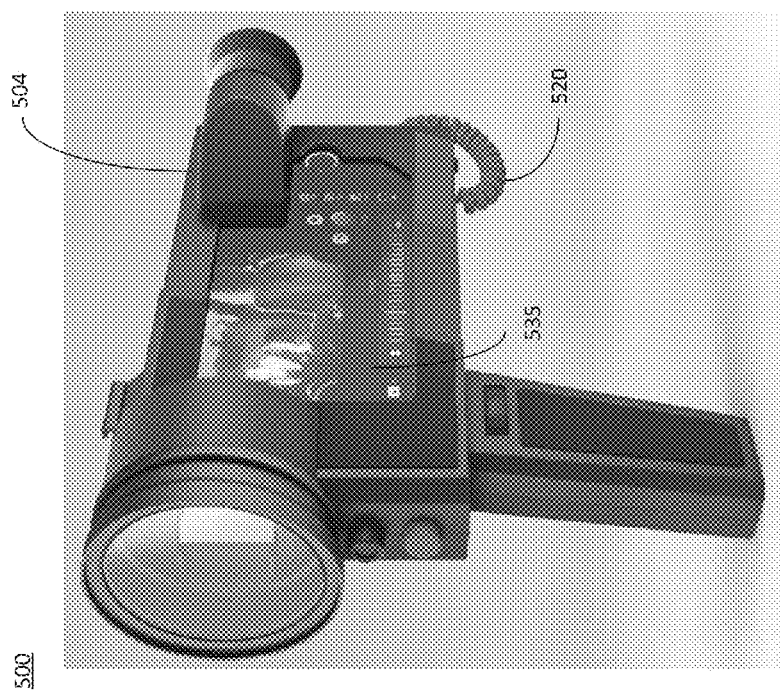
FIG. 5A shows a front perspective view of a system of the present disclosure, with a mobile device being retained within a camera-shaped case and executing a downloadable software application for photography and videography.

The embodiment depicted also includes a microphone 114. Embodiments of the trigger button 107 enable the initiation of photo or video recording on the mobile device and/or the functionality of the microphone 114. The trigger button 107 may initiate these functions via one or more physical mechanisms or digital signal mechanisms. For example, the trigger button may actuate a camera function of the mobile device by physically pressing a button on the device, or by sending a digital signal through a Bluetooth connection or through an auxiliary cable into headphone jack. Alternatively, a signal may be sent through a charging cable such as a lightning cable, or any other cable that corresponds to a plug-in interface of a particular mobile device. Referring briefly to FIGS. 5A and 5B, shown is an embodiment utilizing an auxiliary cable 520. Details of the functionality of the trigger button 107, the microphone 114, and the auxiliary cable 120 will be discussed in greater detail throughout the disclosure. Returning to FIG. 1, embodiments of the camera body 100 may also comprise other accessory features, such as strap eyelets for attaching straps, a built-in strap, on the bottom of the handle 106. For the purposes of this disclosure, the end of the camera body with a lens may be referred to as the "front" and the end of the camera body with the eye piece may be referred to as the "back."

The exterior design of the camera body may vary in many aspects. Many variations in the design of the functional elements are contemplated. For example a handle may be mounted closer to the lens of the camera body, and a trigger may be mounted underneath the lens, on the handle, or on a side of the camera-shaped body. The handle itself may be angled, may have a grip design, or may be foldable. The camera body may be configured such that the smartphone is mounted on either side of the body. For example, the embodiment depicted in FIG. 1 shows a smartphone mounted such that the touchscreen faces the user's left hand side when looking through the eyepiece, but in other embodiments the touchscreen may face the user's right hand side. Further, other embodiments may allow the smartphone to be loaded through the front, back or sides. The various designs shown herein are exemplary only and should not be construed to limit the disclosure.

Figure 2:
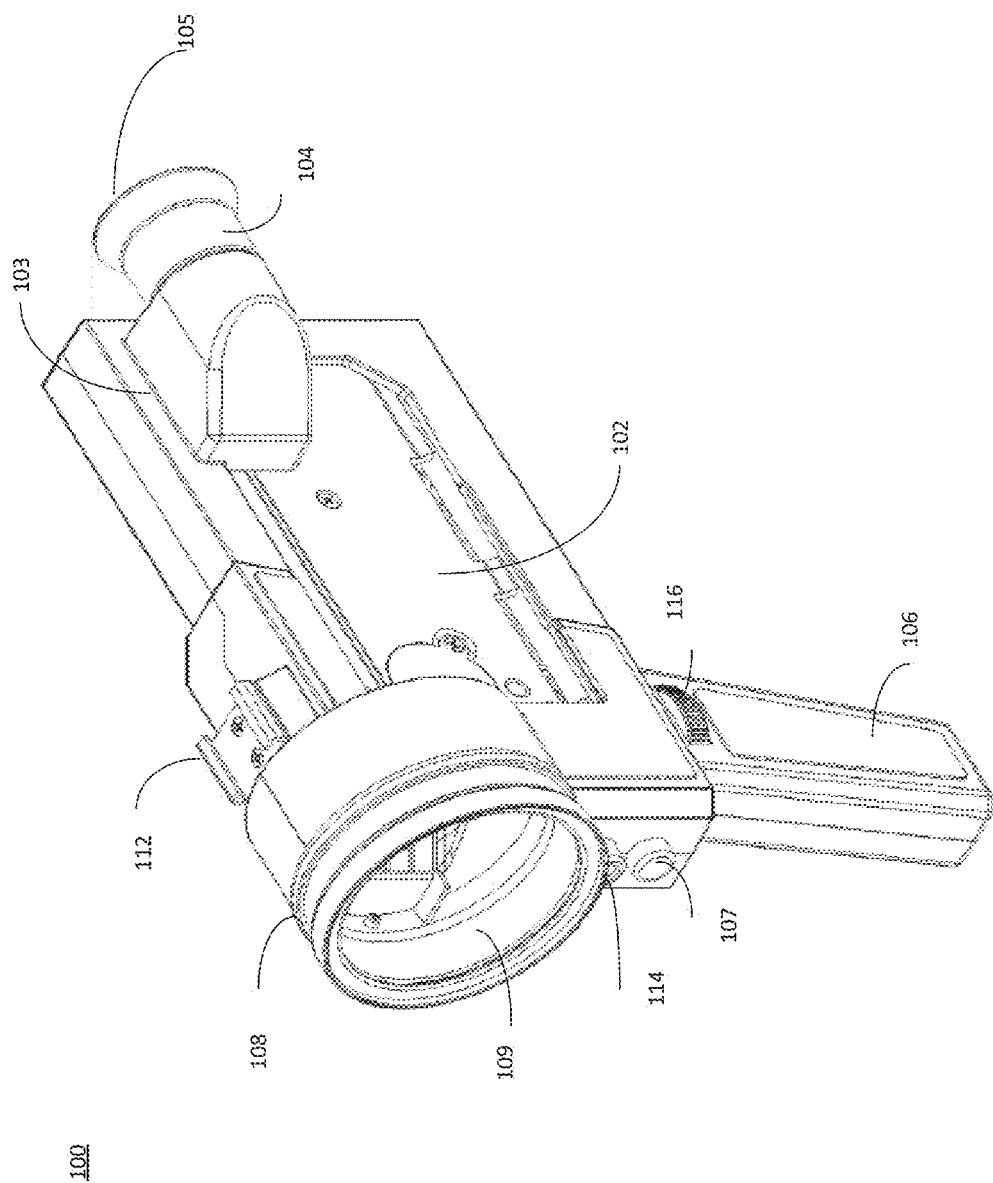
FIG. 2 shows a top front side perspective view of the camera-shaped case of FIG. 1.
Figure 3:
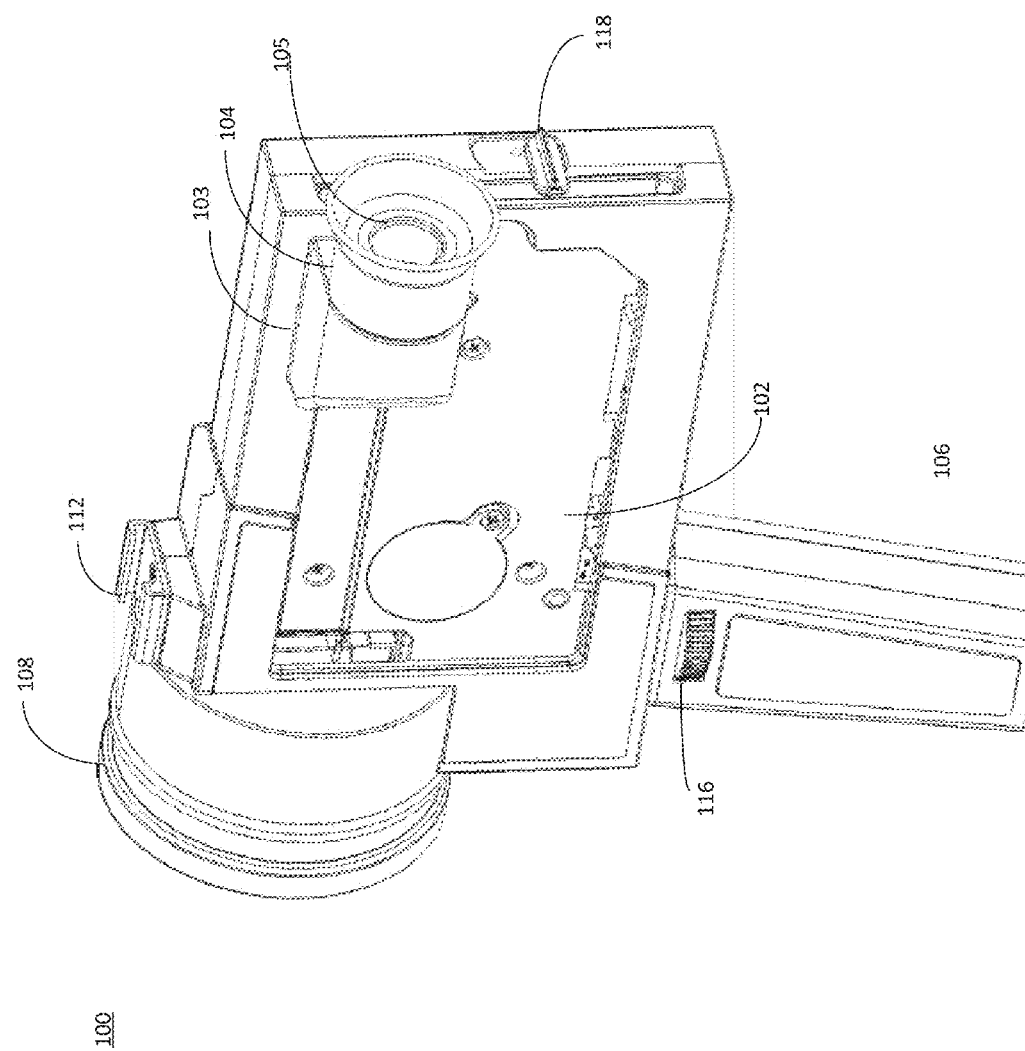
FIG. 3 shows a top back side perspective view of the camera-shaped case of FIG. 1.
Figure 4:
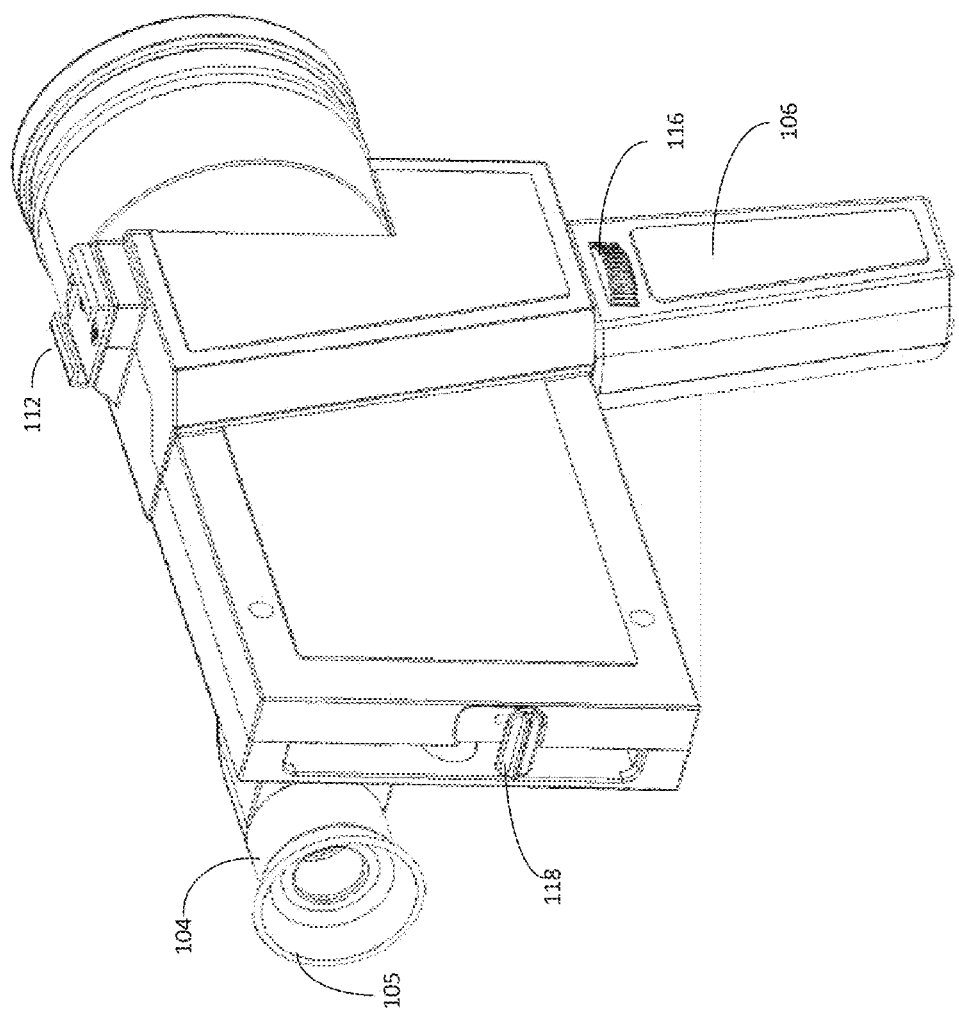
FIG. 4 shows a top back side perspective view of the camera-shaped case of FIG. 1.

FIGS. 2, 3, and 4 show the camera-shaped case of FIG. 1 in top front side perspective, top back side perspective, and opposite top back side perspective views, respectively. The same reference numerals used in FIG. 1 are similarly used in FIGS. 2, 3, and 4 to identify the components described with reference to FIG. 1 and to provide alternative views.

FIGS. 5A and 5B show an embodiment of the camera-shaped case 500 with a smartphone retained within it. As shown in FIG. 5A, the smartphone has a touchscreen graphical user interface ("touchscreen") 535 as known in the art that is partially exposed and partially covered by the viewfinder 504. Also shown is an application for photography and videography displayed on the touchscreen 535. As will be described in further detail shortly, a small, but full version of an image of a shot being photographed or recorded may be displayed onto the portion of the touchscreen 535 that is covered by the viewfinder. As shown in FIG. 5B, an auxiliary cable 520 (which is depicted as coiled in this embodiment) is shown exiting an underside of the camera-shaped case 500 and is inserted into a headphone jack of the mobile device through the back side of the camera body. Functions of the auxiliary cable will be described with reference to other components of the system later in the disclosure.

Figure 6A:
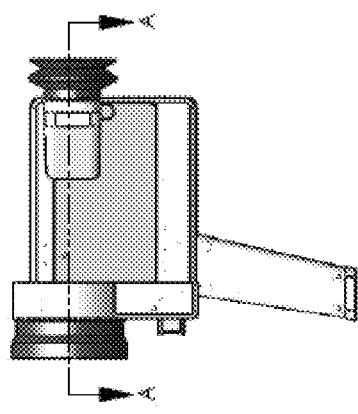
FIG. 6A shows a cross-sectional plane from which the cross-section view of FIG. 6B is taken.
Figure 6B:
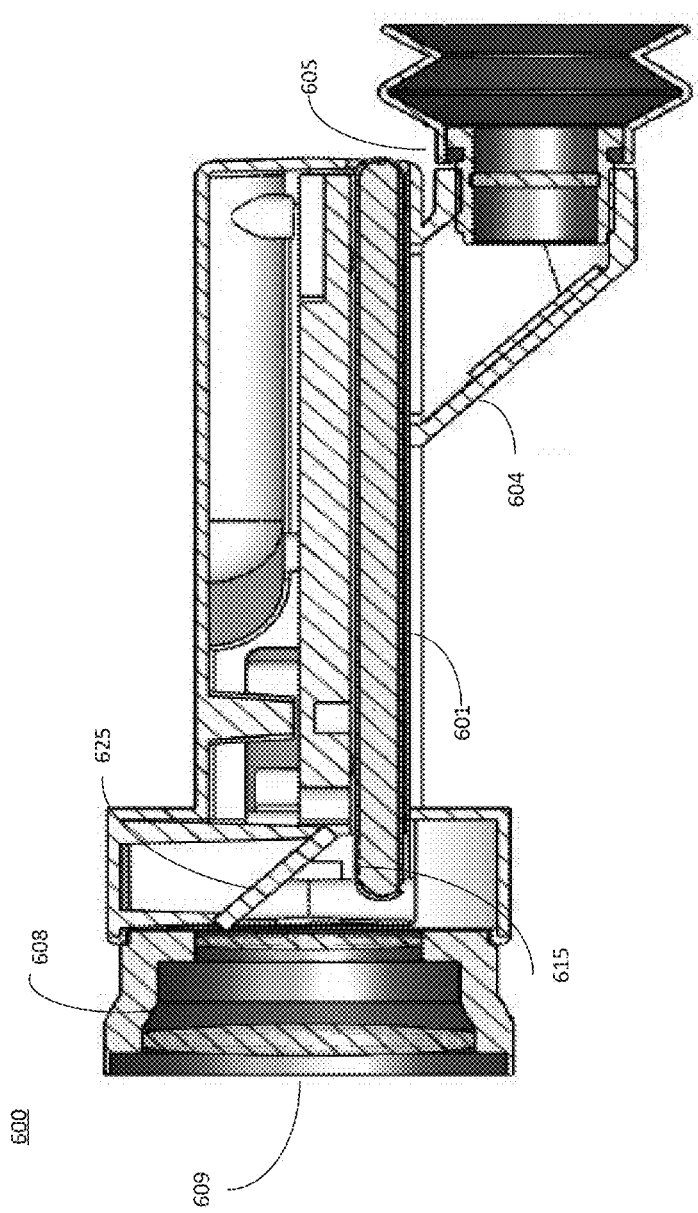
FIG. 6B shows a top cross-section view of a camera-shaped case in accordance with the present disclosure
Figure 6C:
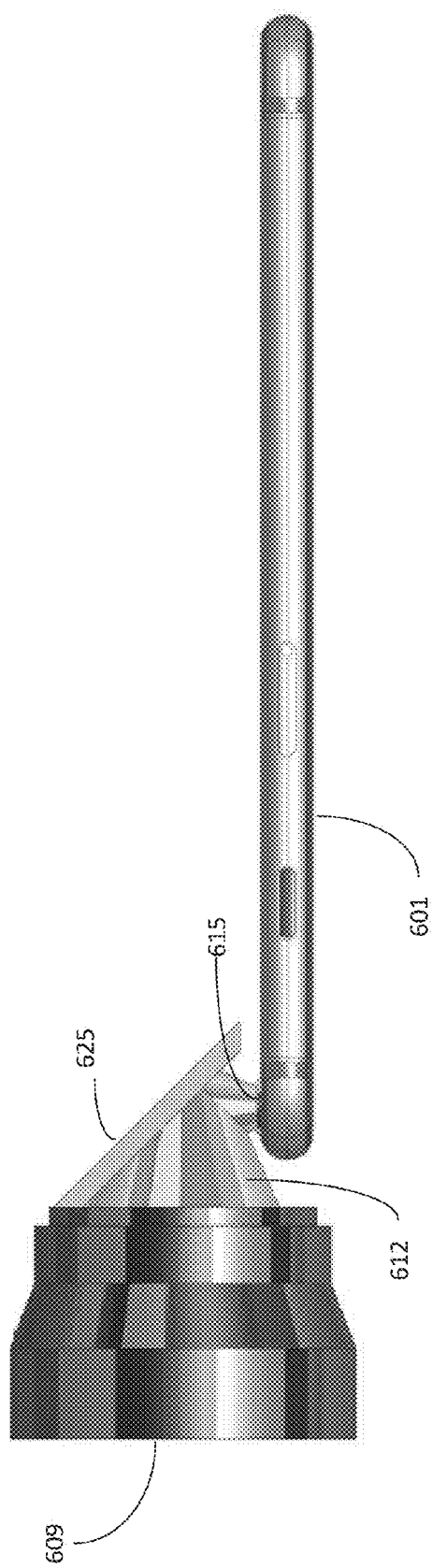
FIG. 6C shows a view of a lens and mirror of the camera-shaped case in relation to a camera lens of a mobile device.

One aspect of the present disclosure relates to projecting an image into a smartphone camera lens while the smartphone camera lens is not actually facing the subject of the shot. For the purpose of clarity, the real-life scenery or objects being photographed or videoed will be referred to herein as a "subject" of a shot, and any rendered or digital representations thereof will be referred to as an "image" thereof. FIG. 6A depicts the cross-sectional plane A-A along which the cross-sectional view in 6B is taken. FIG. 6B shows a smartphone 601 loaded in a camera body 600. The camera body 600 shown has a lens 609, a lens mount 608, a viewfinder 604 and an eye piece 605. FIG. 6C shows the same arrangement of a smartphone 601 and a lens 609 without all of the surrounding components shown in FIG. 6B. As shown, the camera body 600 comprises a mirror 625, which is oriented such that the subject, and the light captured through the lens 609 at which the lens 609 is pointed reflects off of the mirror 625 and into the smartphone camera lens 615. The mirror 625 may project the subject onto the smartphone camera lens 615 as a mirror image, as would be expected given the properties of mirrors, as depicted in FIGS. 6B and 6C. Another aspect of the disclosure is that a downloadable software application on the smartphone itself may reverse the reflected subject received through the smartphone camera lens 615 when the smartphone 601 is loaded into the camera body.

Referring back to FIG. 6B, the lens mount 608 may be configured to interface with standard-size camera lenses, such as 37 mm or 58 mm lenses. A wide variety of professional lenses are available for dedicated film and digital cameras. A benefit of including a lens mount that conforms to standard sizes available in the industry is that photographers can use lenses they already own, or purchase specialized existing lenses without worrying about compatibility issues. There are currently some lens attachments specifically for smartphones available on the market, but they are limited in size and capability because they must be attached to the smartphone body itself. If, for example, a smartphone had a smartphone camera lens in a top right corner of the phone body, a lens attachment could only be so big without being cumbersome or difficult to balance. The lens mount of the present disclosure, in conjunction with the rest of the camera body, makes it possible, and easier, to use a large professional lens. Additionally, the lens mount 608 may include a focus ring to allow a user to manually focus the lens.

Referring back to FIG. 6C, the mirror 625 may be angled and positioned in relation to the lens 609 and the smartphone camera lens 615 such that the light entering the lens, represented by rays 612, may be focused onto a point on the mirror 625 that is an appropriate size to be received by the smartphone camera lens 615. In some embodiments, the lens 609 may be mounted to the camera body by screws and be removable, in order to facilitate cleaning of the mirror 625.

Figure 7:
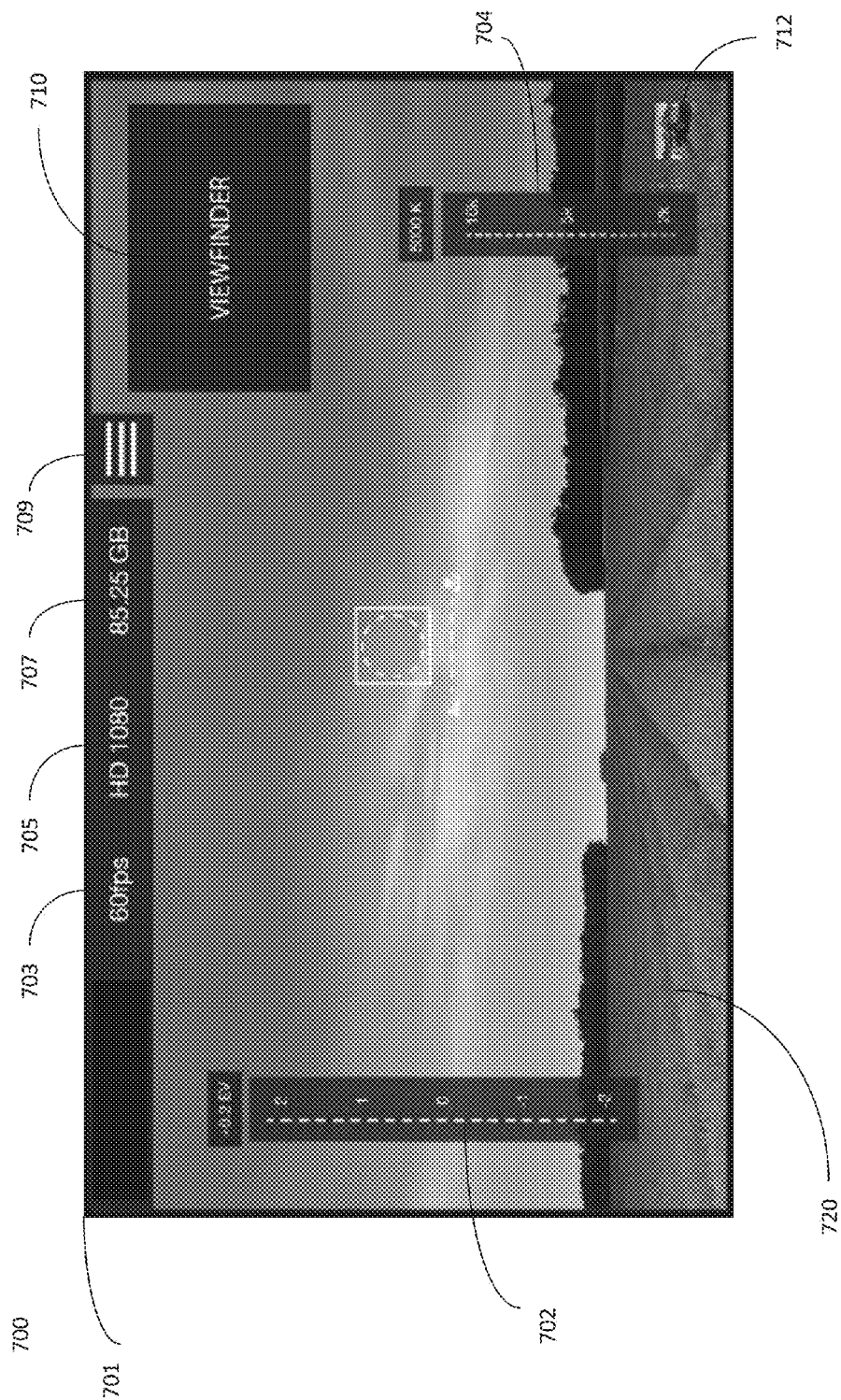
FIG. 7 shows an exemplary screenshot of a downloadable software application on a mobile device that implements aspects of the present disclosure.

As discussed previously, another aspect of the present disclosure is that a downloadable software application (which may be referred to throughout the disclosure as an "app") on the smartphone itself may be used to optimize the functionality of the features of the camera body. FIG. 7 shows a screenshot of an application 700 in accordance with the present disclosure. One aspect of the application 700 is that it may comprise a viewfinder segment 710, which may appear in a portion of the touchscreen graphical user interface of the mobile device. In many embodiments, the viewfinder segment 710 may comprise a relatively small percentage of the entire graphical user interface; in some embodiments, for example, the viewfinder segment 710 may take up only 5-25% of the touchscreen. The viewfinder segment 710 may be used to project the image received by the smartphone camera lens 615 into the viewfinder 103, the structure of which will be described later in this disclosure. The size of the viewfinder segment 710 on the touchscreen may correspond substantially to the size of the viewfinder 103 of the camera-shaped case 100 in many embodiments.

An aspect of the camera-shaped body itself is that it may leave most of the touchscreen area of the smartphone accessible to the user while the smartphone is loaded. The application itself may then incorporate a number of digital photography and videography adjustment functions that would be available on a dedicated digital camera. A few examples of the features are shown in FIG. 7, though more features are contemplated. Some features that may allow a user to adjust aspects of the photos or videos being taken include the exposure 702 and the white balance 704. The application may include an information bar 701 that shows attributes of the camera in its current state. The information bar 701 may also include the frame rate 703, the resolution 705, and the storage space available 707. The application may also include a settings menu 709 and a camera roll 712 for showing previously taken photos or videos. Other features may also be included, though they are not shown on this particular application screen. The application may comprise several other screens, such as those for photo editing, saving to the internal smartphone memory, uploading to social media sites, uploading to remote computers or servers, etc. For example, this application may automatically save all photos and videos to an internal smartphone memory in one mode. The application may also expose an API (application program interface) to other applications, such as social photo and video sharing applications, including live streaming video applications.

The application may display, in addition to an image in the viewfinder segment 710, the image of the present subject being video recorded on the entire screen, with controls overlaid on the image as depicted in FIG. 7 Alternatively, the application may display the image so that it appears on a majority of the screen, but not over all of it, (an example of which is shown in FIGS. 5A and 5B) such that touchscreen controls may be displayed alongside the image. The image shown on the main screen 720 in FIG. 7 may represent the image that is also being displayed simultaneously in the viewfinder segment 710. This feature may be useful to allow a user to adjust the functions such as exposure and white balance while looking at the main screen 520 from the outside of the camera body. Making the image visible on the main screen 720 from the outside of the camera body may be useful because a user may not be able to see the controls that are on the screen while looking through the viewfinder. However, although the controls themselves (e.g., the exposure control 702 and the white balance control 704) may not appear in the viewfinder, it is contemplated that in many embodiments, the properties of the image in the viewfinder segment 710 may appear exactly the same as the view on the main screen 720. For example, if the image on the main screen 720 gets adjusted to be lighter, the image in the viewfinder segment 710 may also be adjusted to be lighter in an identical manner.

Figure 8:
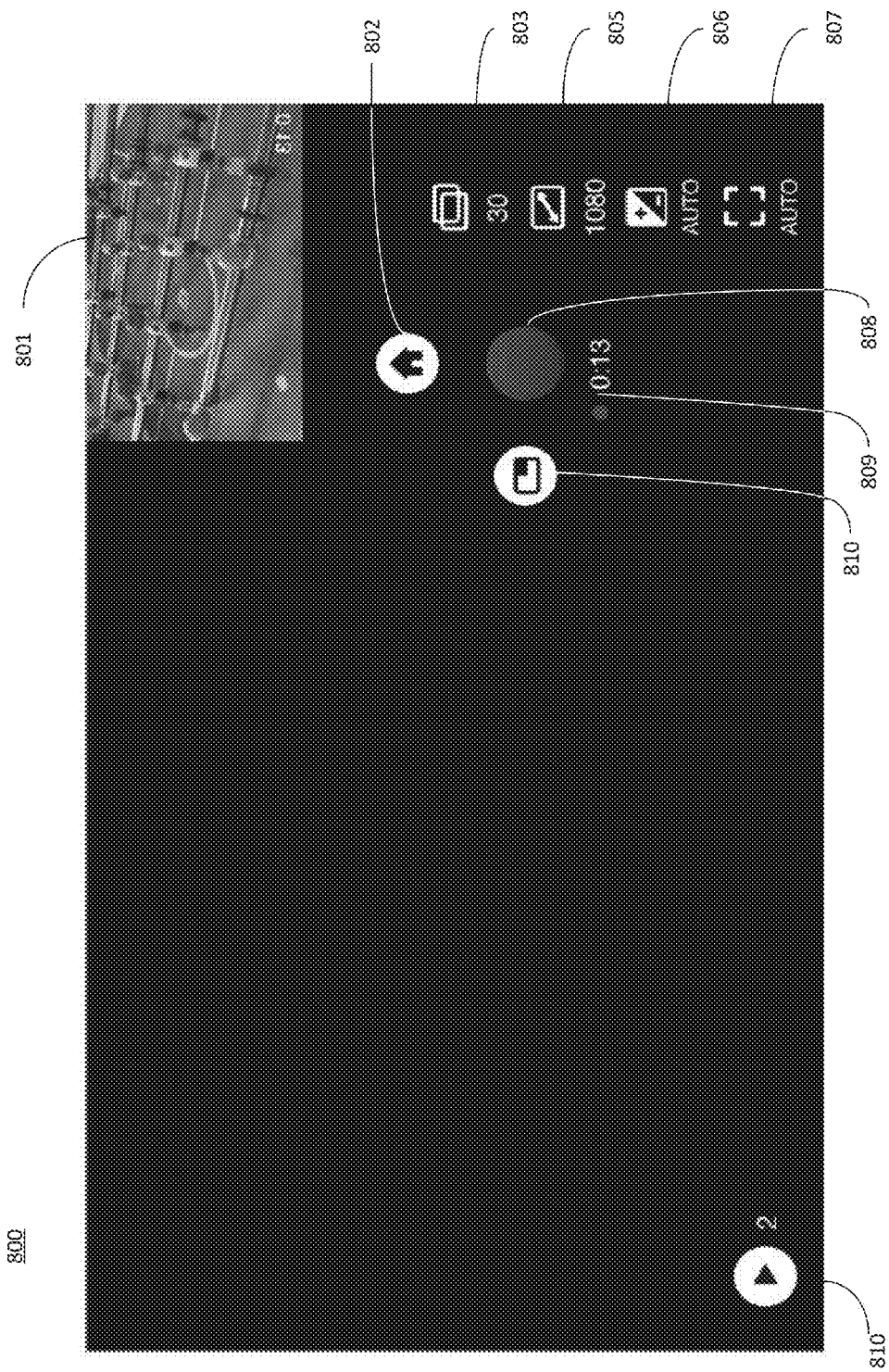
FIG. 8 shows an exemplary screenshot of the software application in a viewfinder mode.

The application may have a mode or an option to turn off the main screen 720 so it is not visible from the outside if the user does not want it to be. In some embodiments, the screen image view may be turned off, but the controls may still remain visible. FIG. 8 shows a "viewfinder mode" 800 of the application in which the controls, but not the image, are visible in the part of the touchscreen that is still exposed when the mobile device is inside the camera-shaped case. In this viewfinder mode 800, the image is reduced and displayed on a viewfinder area 801, which is a portion of the touchscreen that is encompassed by the viewfinder of the camera-shaped case (e.g., the viewfinder 103). A user may desire this viewfinder mode 800, wherein the image is not also displayed on the rest of the touchscreen, for privacy or aesthetic purposes. In alternative embodiments, the same image may be simultaneously displayed in both the area encompassed by the viewfinder and the exposed touchscreen area. As shown, a number of video camera controls are presented on the touchscreen, such as a home button 802, a frame rate adjustment button 803, a resolution adjustment button 805, a zoom button 806, and an autofocus button 807. The app may also present a viewfinder mode toggle button 810. This toggle button 810 may allow a transition between a viewfinder mode in which the image of the shot is shown only in the viewfinder segment of the touchscreen to a mode in which the image is displayed (alternatively or additionally) on the exposed touchscreen area. The app may also present a recording indicator light 808 and timer 809. It is contemplated that additional controls may be presented on screen in other embodiments. Additionally, more controls may be presented to a user in an alternative mode, such as a playback mode or editing mode of the application.

Figure 9:
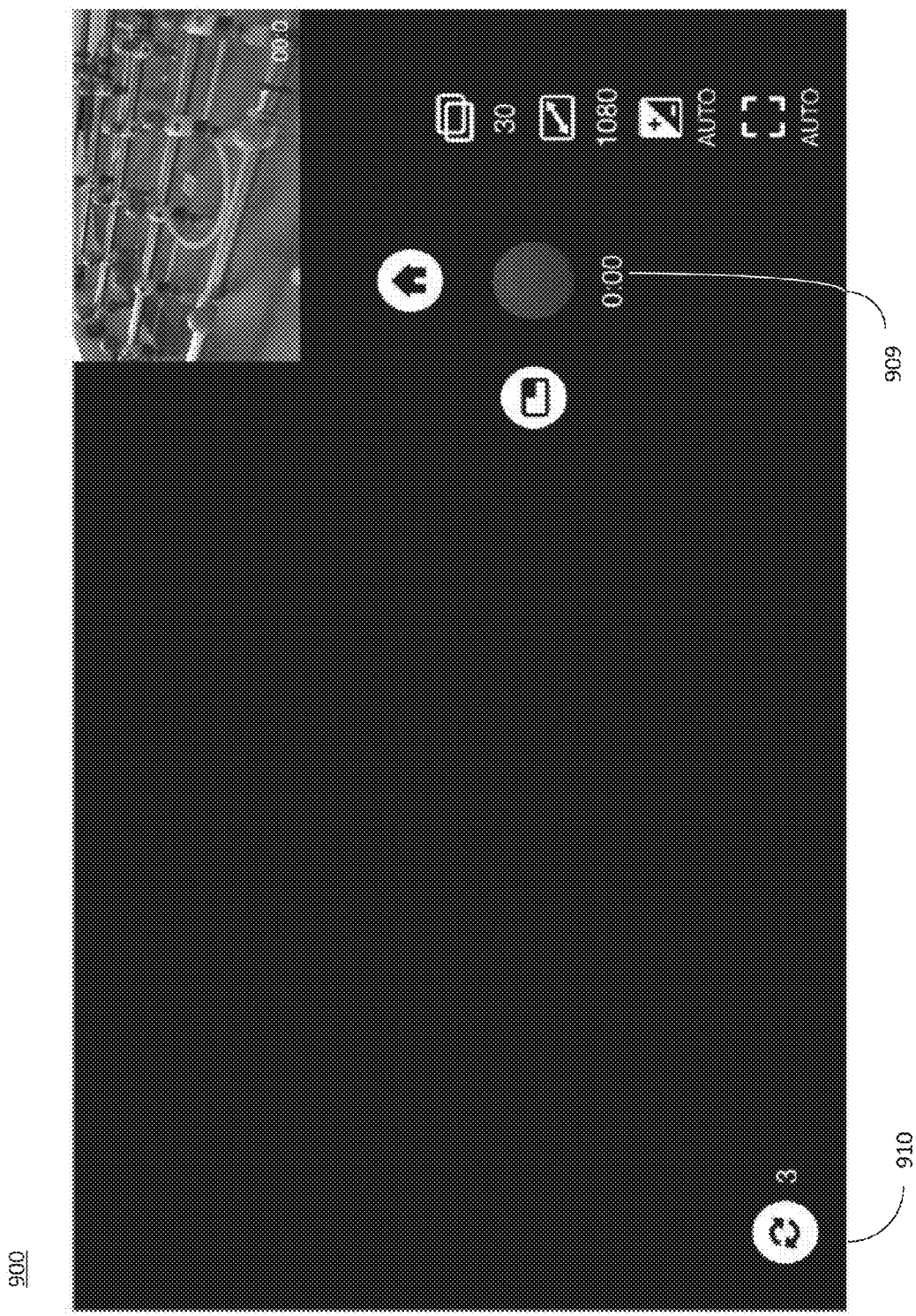
FIG. 9 shows an exemplary screenshot of the software application depicting an uploading function.

An additional feature of the app provides automatic synchronization or uploading to local (e.g. camera memory) or remote (e.g., remote servers) of photos and videos. FIG. 9 shows the app in a similar mode to viewfinder mode 800 of FIG. 8. FIG. 8 shows the app while recording is actively taking place, as indicated by the timer 809 showing an amount of time recorded and the play button 810 being displayed in the bottom left corner. In contrast, FIG. 9 shows the app in a different version of the viewfinder mode 900 which is a synchronization or uploading mode, as indicated by the timer 909 showing no running timer, and a synchronization button 910 showing a symbol indicating that uploading is taking place. As previously mentioned, synchronization or uploading of photos and videos can allow a user to save his or her digital images locally or remotely. In some embodiments of the application, this synchronization may occur automatically, and its automatic functionality may be configurable by a user. In some embodiments, the synchronization may allow the sharing of a user's digital content through existing and yet-to-be-created social media via an API of the app.

Figure 10:
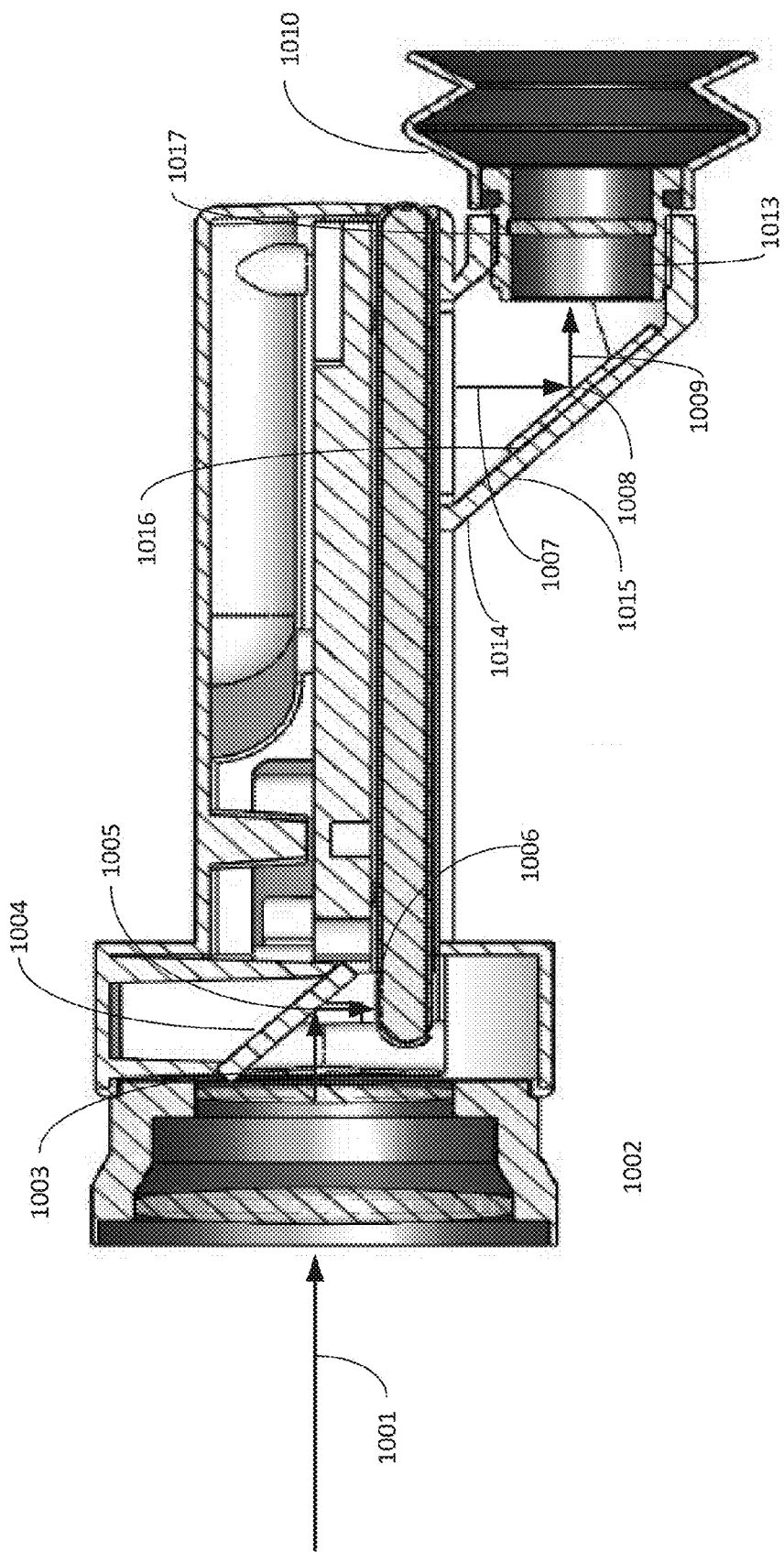
FIG. 10 shows a top cross-section view similar to the top-cross-section view in FIG. 6B and demonstrating how an image may be presented to a user via the system of the present disclosure.

Turning to FIG. 10, shown is a cross-sectional view similar to the view shown in FIG. 6A to show the structure of the viewfinder 1015 in greater detail. FIG. 10 also shows the overall path of an image as it travels through the camera body and application in the system of the present disclosure. The viewfinder 1015 allows the user to see or preview the subject of the photo or video. Beneficially, a user may see or preview the subject in more ideal conditions, such as with limited interference from surrounding bright light. That is, the viewfinder 1015 and eyepiece 1010 block surrounding light so that the user can see the image on the graphical use interface more clearly than is possible when taking a picture or video on a smartphone in bright light. Additionally, the viewfinder allows the user to see the subject in an ergonomic fashion, even though the smartphone screen is turned in a perpendicular direction in relation to the subject. The viewfinder 1015 may comprise an eyepiece 1010, which may be configured to substantially fit or conform to an area around a user's eye. The eyepiece may be soft and flexible in some embodiments, and could be made out of rubber or a similar material. Alternatively, the eyepiece may be more rigid and durable and made of a hard plastic or similar material. The eyepiece may partially or completely eliminate surrounding light inside the viewfinder 1015. The viewfinder 1015 may further comprise a viewfinder lens 1013, a viewfinder housing 1014, viewfinder mirror 1016, and a focus ring 1017. The viewfinder lens 1013 may simply be a clear piece of glass or other transparent material that prevents any dirt or foreign objects from entering the viewfinder housing 1014. Alternatively, the viewfinder lens 1013 may have a translucent pattern comprising dots, squares, or lines imprinted upon it that allow the user to align a shot, much like viewfinder lenses known in the art.

The viewfinder 1015 may also comprise a viewfinder mirror 1016 that reflects an image from the viewfinder segment of the screen (seen in FIG. 7 on the application screen as viewfinder segment 710). The viewfinder mirror 1016 may reflect the image through the viewfinder lens 1013 so that the image is visible to the user. The focus ring 1017 may allow the user to manually adjust the focus in the event that the projected image does not appear clearly to the user. For example, if the user normally wears glasses, but wishes to take them off to look through the viewfinder, the focus ring may allow the user to view the image clearly. The viewfinder housing 1014 may house all the components of the viewfinder 1015, align them so the viewfinder segment is projected properly through the eyepiece 1010, and prevent outside light from shining on the viewfinder segment. In some embodiments, at least a portion of the viewfinder 1015 may be removable in order to facilitate cleaning of the various components.

Referring back to the software application, another aspect of the disclosure is that the application may automatically orient the image so it matches the orientation of the subject, in order to account for any reversals of subsequent projected or rendered images. The image of the subject may be flipped vertically and reversed horizontally several times due to the mirrors 1004 and 1016 and the multiple lenses. FIG. 10 highlights the pathways of projected and rendered images throughout the areas of the camera body and the smartphone itself. As shown, light may first enter the front of the camera body through the lens at 1001. It is known in the art of camera lenses that lenses invert an image onto the surface upon which the image is projected. Therefore, it is contemplated that the image projected at 1003 onto the mirror 1004 may be upside-down as compared to the subject received at 1001. As the image is reflected at 1005 off of the mirror 1004 and into the smartphone camera lens 1006, the image may also be reversed horizontally (i.e., a mirror image) as compared to the subject received at 1001. It is contemplated that most smartphone camera lenses invert images as they are received in a similar manner to conventional camera lenses (such as lens 1002), then use internal hardware and/or software to render the image right-side up to the viewer. Therefore, the image provided by the smartphone, and received by the application, may be upside down because the reflected image at 1005 is upside-down. Further, the image may also be reversed horizontally. To account for the fact that the image may be upside-down and reversed horizontally, the application may flip the image back right side up and to its original horizontal orientation in order to display the image as expected by the user in a full screen image setting (e.g., full screen image 720 of FIG. 7). However, the application may not apply the same transformation to the image to be displayed in the viewfinder segment 710. The image displayed in the viewfinder segment 710 may be reflected and therefore reversed horizontally one more time at 1007 off of the viewfinder mirror 1008 when it is projected at 1009 through the viewfinder lens 1013. Therefore, the image actually rendered on the screen at the viewfinder segment 710 may be reversed horizontally as compared to the full screen image 720. As a result, the full screen image 720 and the image the user sees through the viewfinder may be the same correct orientation as the subject.

One aspect of the present disclosure provides a trigger button to facilitate recording. One favorite feature of users of old Super 8 cameras was the trigger button, which the user would hold down during the duration of the shot and release to stop recording. In contrast, in nearly every form of digital recording, a button must be pressed and then released immediately to begin recording, and then pressed and released immediately to end the recording. In many cases, the button that must be pressed and released is on a touchscreen, and therefore does not provide any tactile feedback when pressed. Additionally or alternatively, a physical side button may be depressed and released. One main drawback of a touch-and-release button, which many users have experienced when trying to record a video on a smartphone, is that either the first touch and release doesn't register and the video doesn't start recording at the correct time, or the second tap and release doesn't register and the video doesn't end on time. Sometimes, users miss a shot entirely if they think they have touched the button but have actually missed it. Users may fail to press a button correctly to start or stop a video for a number of reasons, including that the start and stop button is on a flat touchscreen and a user cannot tell where to press without directly looking at the button. Additionally, users may be distracted by other things in their fields of vision. The trigger button of the present disclosure allows a user to more precisely control the starting and stopping of a recording by pressing and holding down the trigger button to record and releasing the trigger button to stop.

Figure 11:
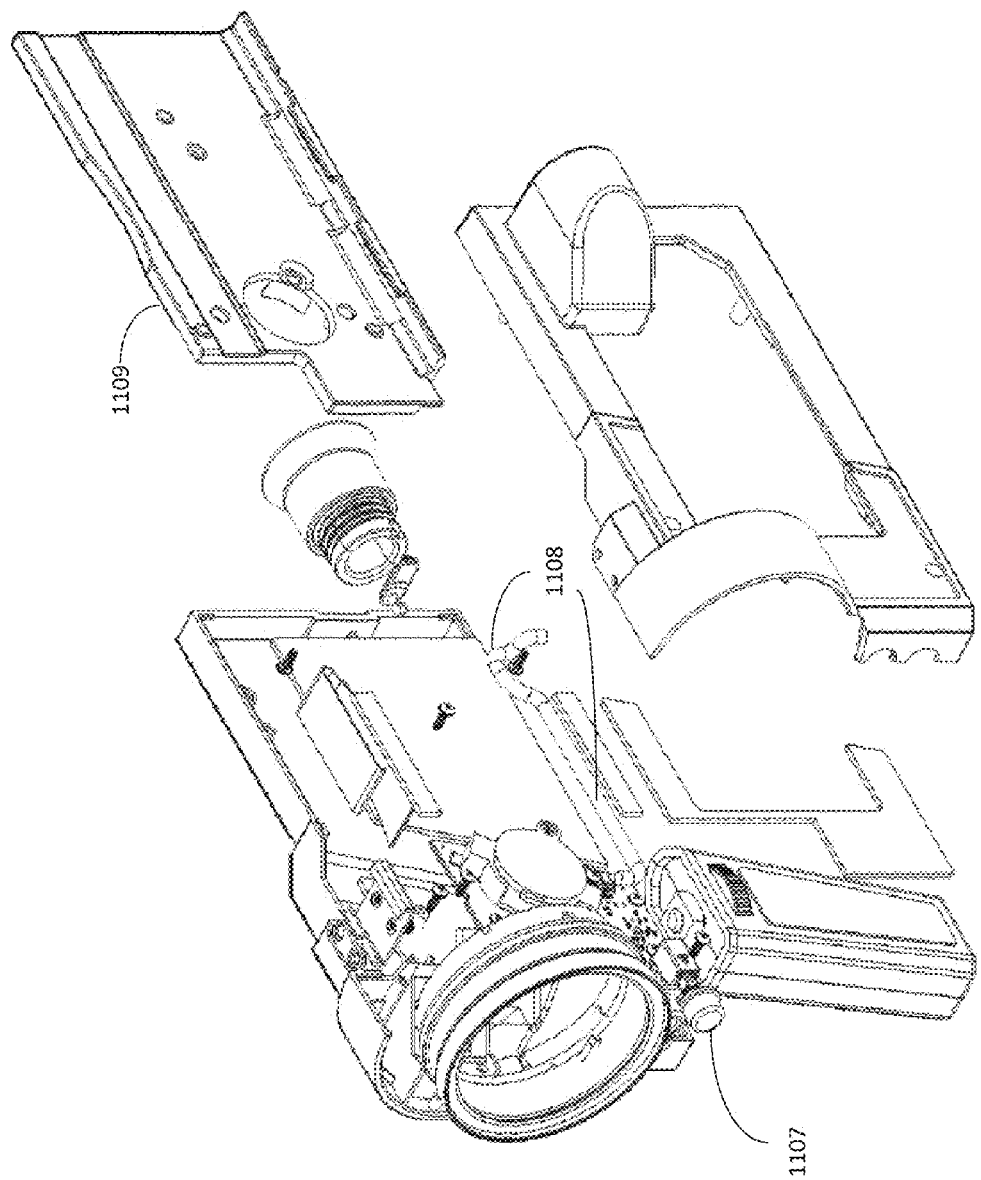
FIG. 11 shows a partially exploded view of a camera-shaped case of the present disclosure.

In order to translate the action of pressing and holding of the trigger button into beginning and maintaining a recording, a variety of mechanisms and/or signals may be employed. In some embodiments, the trigger button may activate recording to start and stop on the mobile device via a cable such as an auxiliary cord. FIG. 11 shows a partially exploded view of an embodiment in which a cable 1108 is attached on the inside of the main camera body to the trigger button 1107. The cable 1108 runs along the length of the bottom of the camera body and exits out of the bottom near the back of the camera body. As shown, the cable ends in a standard auxiliary interface that may be inserted into a headphone jack of the mobile device as known in the art. As previously discussed, another type of cable, such as a lighting charger cable or other physical cable specific to particular mobile devices, may also be used to implement the functionality of the auxiliary cable described throughout this disclosure. An aspect of the present disclosure is that the pressing of the trigger button may send a signal to mobile device through the cable and activate photo, video, and audio functions of the mobile device via the application. For example, in some embodiments, the pressing and holding of the trigger button may send a signal through the cable to the application to initiate and maintain the recording of a video. Additionally, the pressing and holding of the trigger may activate and maintain the function of the microphone to pick up sound and send it through the cable to the mobile device. It is also contemplated that in some embodiments, a digital signal may be sent via a wireless radio-frequency transmission protocols such as a Bluetooth signal. Either an auxiliary cable embodiment or a Bluetooth embodiment may be used to activate functions described herein. Advantages to each kind of embodiment are contemplated. For example, an auxiliary cable embodiment may provide reliability of connectivity without the need for Bluetooth synchronization, which sometimes requires a user to press several menu button selections. A Bluetooth connection may provide the advantages of wireless connectivity.

In embodiments of the present disclosure, when the application receives the signal from the trigger button to start recording on the mobile device, and it receives audio through the microphone through the headphone jack, it may also automatically place the application in viewfinder mode, such that the entire image being recorded is presented in the viewfinder section of the application. The application may remain in viewfinder mode before or after the trigger button is pressed and/or released, but automatically placing the application in viewfinder mode allows the benefit of making sure the image is viewable to a user when he or she is recording.

In some embodiments, pressing and releasing the trigger button may itself begin recording, and then pressing and releasing the trigger button a second time may stop the recording. Such press-and-release functionality to stop and start recording may be preferable to some users who are used to pressing and releasing physical or touchscreen buttons on their mobile devices to start and end recordings. In some embodiments, the functions corresponding to "press and hold" and "press and release" may be configurable by a user. It is contemplated that the application may have a mode for taking still photographs, in which case pressing and releasing may simply take a photo.

In other embodiments, the trigger button may function by mechanically pressing (and holding/releasing) an existing touchscreen or physical button on the mobile device, instead of activating the recording or photography through a signal send through a cable to the app. A number of physical mechanisms for causing a button on the smartphone to be pressed and released are contemplated. For example the trigger button may be connected to an arm. As the trigger button is depressed, the arm may move along the longitudinal axis of the camera body from the front end to the back end. The arm may be connected to an actuating mechanism, which may be configured to move vertically up and down once in response to the longitudinal movement of the arm, pressing and releasing a button on the smartphone. The actuating mechanism may comprise, for example, a spring, a latch, or an angled protrusion. The release of the trigger button may cause the arm to move back toward the front of the camera body, which in turn causes the actuating mechanism to press and release the button again. The arm may be urged forward by a longitudinal spring. In some embodiments, the button on the smartphone that is pressed and released to start and stop the recording is a physical side button which may be raised, as is known in the art. Many smartphones allow the control of the camera from such a side button as well as from a touchscreen button. Though not shown it is contemplated that other embodiments may cause a touchscreen button to be pressed and released twice in response to the trigger press and release. In such an embodiment, the application may present a button at a location on the touchscreen. When the trigger is designed to press a touchscreen button instead of a mechanical raised button, the actuating mechanism may comprise an energy conducting material, such as a conductive fiber, to actuate the touchscreen.

Referring again to FIG. 11, shown is a receptacle 1109 for a smartphone retained within the housing that may be removable in some embodiments and act as a separate protective case. Another aspect of the disclosure provides a smartphone case for certain embodiments. Many smartphone users already use protective cases, and the smartphone case of the present disclosure may provide desired protection while also making the smartphone fit securely into the camera body. For example, a user may be able to insert the smartphone, still in its smartphone case, into the camera body, and the smartphone case and camera body may use an interlocking mechanism, such as a latch, a spring, or a detent, to keep the smartphone securely in the camera body. Such a locking mechanism may exist separate from the retaining mechanism 118 (as shown in FIG. 3). An advantage to using a smartphone case that is specifically compatible with the camera body of the present disclosure is that a user wouldn't have to remove a different protective case in order to use the camera body, and wouldn't risk misplacing it. Additionally, certain embodiments of the smartphone case may be configured to facilitate certain operations of the camera body itself, such as a trigger button.

It is known in the art that manufacturers of smartphones frequently release new models, and that the new models sometimes vary slightly in overall size and shape compared to previous models. Embodiments of the present disclosure may come in sizes, shapes, and configurations that align the functional aspects of the camera body to align with specific makes and models of smartphones and fit snugly. Additionally, between different manufacturers, the locations of certain physical features vary, such as physical buttons and camera lenses. Embodiments of the present disclosure many also come in configurations that account for these differences as well. For example, the front lens and mirror may be placed higher or lower to account for a camera lens being located in the center, left, or right side of the smartphone body.

In other embodiments of the disclosure, the smartphone case may act as an adapter between a later model smartphone and a camera body designed for a previous model smartphone. For example, a smartphone manufacturer may make a popular model (e.g., model number 6), and a user may buy a camera body of the present disclosure specifically made for the model number 6. Then, the manufacturer may subsequently make another popular model (e.g., model number 7), which may be slightly smaller and slightly differently shaped that the model 6. A smartphone case of the present disclosure may fit around the newer model 7, but be adapted to fit snugly and align the functional features with the camera body made for the model 6. Such an adaptive smartphone case may allow a user to use a single camera body for a longer period of time, over more than one model of smartphone.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and novel features disclosed herein.

What is claimed is:

1. A case designed to look like a dedicated camera for a mobile device having an integrated camera, the case comprising:
   a main body configured to retain a mobile device entirely within the main body;
   a front lens connected to a front side of the main body, the front lens configured to direct light received through the front lens into a camera lens of the mobile device, wherein the front lens and the camera lens of the mobile device are arranged substantially perpendicularly to each other and the mobile device is held in position directly behind a circumference of the lens from a perspective of a front of the front lens;
   a viewfinder configured to be substantially in physical contact with a graphical user interface on the mobile device and cover only a viewfinder portion of the graphical user interface;
   an eyepiece comprising an eyepiece lens connected to the viewfinder, wherein the viewfinder is configured to direct any visible content displayed on the viewfinder portion so that only visible content displayed on the viewfinder portion is viewable through the eyepiece lens, and the eyepiece lens is configured to be arranged substantially perpendicularly to the graphical user interface when the mobile device is retained,
   a button disposed on the exterior of the case configured to actuate a camera function of the mobile device; and
   an electrical connection apparatus configured to connect with the mobile device,
      wherein the main body retaining the mobile device is configured to expose a portion of the graphical user interface that is not covered by the viewfinder.

2. The case of claim 1, further comprising one or more mirrors to direct the light received through the front lens into the camera lens of the mobile device.

3. The case of claim 1, further comprising one or more mirrors to direct the image from the graphical display on the mobile device through the eyepiece.

4. The case of claim 1, further comprising a handle extending downward from a bottom side of the main body, directly underneath at least a portion of the mobile device.

5. The case of claim 4, wherein the handle comprises the button on a front side of the handle that actuates an image capture function of the mobile device via the electronic connection.

6. The case of claim 1, further comprising a lens mount surrounding the front lens, the lens mount being configured to retain a separate lens.

7. The case of claim 1, wherein the electrical connection apparatus comprises a cable connected to the button and configured to be inserted into a jack of the mobile device.

8. The case of claim 1, further comprising a microphone.

9. A system for mobile device photography and videography, the system comprising:
- a case designed to look like a dedicated camera and configured to retain a mobile device entirely within the case, the case comprising:
  - a front lens affixed to a front side of the case, the front lens configured to direct an image received through the front lens into a camera lens of the mobile device, wherein the front lens and the camera lens of the mobile device are arranged substantially perpendicularly to each other and the mobile device is retained directly behind a circumference of the front lens in relation to a front of the front lens;
  - a viewfinder substantially in physical contact with a graphical user interface on the mobile device that covers only a viewfinder portion of the graphical user interface;
  - an eyepiece comprising an eyepiece lens connected to the viewfinder, wherein the viewfinder is configured to direct any visible content displayed on the viewfinder portion so that only visible content displayed on the viewfinder portion is viewable through the eyepiece lens, and the eyepiece lens is arranged substantially perpendicularly to the graphical user interface;
  - a button disposed on the camera-shaped case configured to actuate a camera function of the mobile device; and
  - an electronic connection between the case and the mobile device; and
- a downloadable software application executable on the mobile device and configured to:
  - display an entire version of the image received through the camera lens of the mobile device onto the viewfinder portion; and
  - display one or more videography controls on a touchscreen portion of the graphical user interface at the same time the entire version of the image is being displayed on the viewfinder portion that is covered by the viewfinder.

10. The system of claim 9, wherein the downloadable software application is further configured to:
- display a second entire version of the image received through the camera lens of the mobile device onto a second portion of the graphical user interface outside the viewfinder portion.

11. The system of claim 8, wherein recording of a video is initiated on the mobile device by pressing the button.

12. The system of claim 11, wherein the pressing of the button sends a signal through the electrical connection to the mobile device.

13. The system of claim 12, wherein the pressing of the button sends the signal through the electronic connection to the application on the mobile device and simultaneously activates a microphone.

\* \* \* \* \*